United States Patent
Mitchell et al.

(10) Patent No.: US 10,664,388 B2
(45) Date of Patent: May 26, 2020

(54) CONTINUOUS INTEGRATION TESTING FOR NETWORK-BASED APPLICATIONS

(71) Applicant: T-Mobile USA, Inc., Bellevue, WA (US)

(72) Inventors: Michael J. Mitchell, North Bend, WA (US); Peter P. Myron, Renton, WA (US); Samson Kim-Sun Kwong, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 2 days.

(21) Appl. No.: 15/622,697

(22) Filed: Jun. 14, 2017

(65) Prior Publication Data

US 2018/0365133 A1    Dec. 20, 2018

(51) Int. Cl.
| | | |
|---|---|---|
| *G06F 9/44* | (2018.01) | |
| *G06F 11/36* | (2006.01) | |
| *G06Q 10/06* | (2012.01) | |
| *G06F 11/00* | (2006.01) | |
| *G06F 8/60* | (2018.01) | |
| *G06F 8/71* | (2018.01) | |

(52) U.S. Cl.
CPC ............ *G06F 11/3688* (2013.01); *G06F 8/60* (2013.01); *G06F 8/71* (2013.01); *G06F 11/3664* (2013.01)

(58) Field of Classification Search
CPC .... G06F 11/3688; G06F 11/3664; G06F 8/71; G06F 8/60; G06F 8/70; G06F 8/77; G06Q 10/06; G06Q 10/06313; G06Q 10/06375
See application file for complete search history.

(56) References Cited

U.S. PATENT DOCUMENTS

| | | | |
|---|---|---|---|
| 6,970,924 B1 | 11/2005 | Chu et al. | |
| 7,912,967 B2 * | 3/2011 | Mace | H04L 63/029 |
| | | | 709/203 |
| 9,201,646 B2 * | 12/2015 | Balachandran | G06F 8/71 |
| 9,547,584 B2 | 1/2017 | Acharya et al. | |

(Continued)

FOREIGN PATENT DOCUMENTS

WO    WO2014176243    10/2014

OTHER PUBLICATIONS

Bachmann et al., The missing links: bugs and bug-fix commits, 10 pages (Year: 2010).*

(Continued)

*Primary Examiner* — Thuy Dao
(74) *Attorney, Agent, or Firm* — Lee & Hayes, P.C.

(57) ABSTRACT

A system for testing a network-based application has a continuous integration (CI) service that performs CI testing of a server application that is being developed to support a client application, such as a client application that will be used on a wireless communication device. The CI service detects server source code changes and in response rebuilds the server application and deploys it to a test server. In addition, the client application is installed and executed on one or more wireless communication devices, so that the client application communicates with the test server using a wireless communications network. Tests of the client application are performed as it executes on the devices, and results are reported to the CI service. The CI service reports any errors that occurred during testing of either the server application or the client application.

20 Claims, 5 Drawing Sheets

(56) References Cited

U.S. PATENT DOCUMENTS

| | | | |
|---|---|---|---|
| 9,588,876 B2 * | 3/2017 | Swierc | G06F 11/3668 |
| 9,600,393 B2 * | 3/2017 | Golde | G06F 11/3612 |
| 9,703,686 B2 * | 7/2017 | dos Santos | G06F 11/3688 |
| 10,114,637 B1 * | 10/2018 | Willson | G06F 8/71 |
| 2004/0088405 A1 | 5/2004 | Aggarwal | |
| 2005/0089028 A1 | 4/2005 | Hopkins | |
| 2007/0245313 A1 * | 10/2007 | Hardy | G06F 11/3688 717/124 |
| 2008/0104575 A1 * | 5/2008 | Fan | G06F 11/36 717/124 |
| 2008/0126653 A1 | 5/2008 | King et al. | |
| 2008/0139195 A1 | 6/2008 | Marsyla et al. | |
| 2009/0083268 A1 * | 3/2009 | Coqueret | G06F 8/71 |
| 2010/0274850 A1 * | 10/2010 | Mace | H04L 63/029 709/203 |
| 2011/0219111 A1 | 9/2011 | Shevenell | |
| 2012/0009918 A1 | 1/2012 | Wu | |
| 2013/0267179 A1 | 10/2013 | Parekh et al. | |
| 2014/0160941 A1 | 6/2014 | Hui et al. | |
| 2014/0189641 A1 | 7/2014 | Anderson et al. | |
| 2015/0081850 A1 | 3/2015 | Mittal | |
| 2015/0082283 A1 | 3/2015 | Smith et al. | |
| 2015/0124891 A1 | 5/2015 | Hwang et al. | |
| 2015/0201045 A1 | 7/2015 | Komirelly et al. | |
| 2015/0220426 A1 | 8/2015 | Spektor et al. | |
| 2015/0227355 A1 * | 8/2015 | Tripoli | G06F 8/63 717/175 |
| 2016/0232079 A1 | 8/2016 | dos Santos et al. | |
| 2017/0010889 A1 * | 1/2017 | Spektor | G06F 8/71 |
| 2017/0339630 A1 | 11/2017 | Ketonen et al. | |
| 2017/0366983 A1 | 12/2017 | Gunasekara et al. | |
| 2018/0011955 A1 | 1/2018 | Gintis | |
| 2018/0124150 A1 | 5/2018 | Myron et al. | |
| 2018/0129497 A1 * | 5/2018 | Biddle | G06F 11/3668 |
| 2018/0293158 A1 * | 10/2018 | Baughman | G06F 11/3692 |
| 2018/0367940 A1 | 12/2018 | Kwong et al. | |
| 2018/0368010 A1 | 12/2018 | Mitchell et al. | |

OTHER PUBLICATIONS

Office action for U.S. Appl. No. 15/622,752, dated Jan. 18, 2018, Kwong, "Distributed Testing of Wireless Networks", 10 pages.

Office action for U.S. Appl. No. 15/338,069, dated Jan. 22, 2018, Myron, "Remote Access of Cellular Communication Devices for Software Development and Testing", 22 pages.

PCT Search Report and Written Opinion dated Jan. 29, 2018 for PCT Application No. PCT/US17/56796, 13 pages.

PCT Search Report and Written Opinion dated Sep. 18, 2018 for PCT Application No. PCT/US18/34937, 13 pages.

Office action for U.S. Appl. No. 15/622,752, dated May 25, 2018, Kwong, "Distributed Testing of Wireless Networks", 11 pages.

Office Action for U.S. Appl. No. 15/338,069, dated May 4, 2018, Myron, "Remote Access of Cellular Communication Devices for Software Development and Testing", 27 pages.

Non Final Office Action dated Jan. 7, 2019 for U.S. Appl. No. 15/622,752 "Distributed Testing of Wireless Networks" Kwong, 12 pages.

Office Action for U.S. Appl. No. 15/622,807, dated Oct. 25, 2018, Mitchell et al, "Device-Based Diagnostic Network Testing", 10 pages.

Office action for U.S. Appl. No. 15/622,807, dated Apr. 2, 2019, Mitchell, "Device-Based Diagnostic Network Testing", 13 pages.

Office Action for U.S. Appl. No. 15/622,807, dated Jul. 17, 2019, Mitchell, "Device-Based Diagnostic Network Testing", 13 pages.

* cited by examiner

CONTINUOUS INTEGRATION TESTING FOR NETWORK-BASED APPLICATIONS

BACKGROUND

Mobile communication devices such as smartphones, tablet computers, wearable devices, etc. are widely used by consumers for many things other than voice communications. Specifically, these devices are designed so that consumers can install various applications, which may perform many different tasks. For example, applications may be used for things such as shopping lists, text messaging, social network communications and sharing, research, weather reporting, news, and so forth.

Applications such as this often rely on interactions with remote servers and/or data stores, and may further rely on wireless data connectivity to communicate with such remote servers or data stores. For example, a weather application on a mobile device may communicate with a remote server in order to obtain weather information. Similarly, a list application may store lists on a remote server or database so that the lists can also be accessed on multiple devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
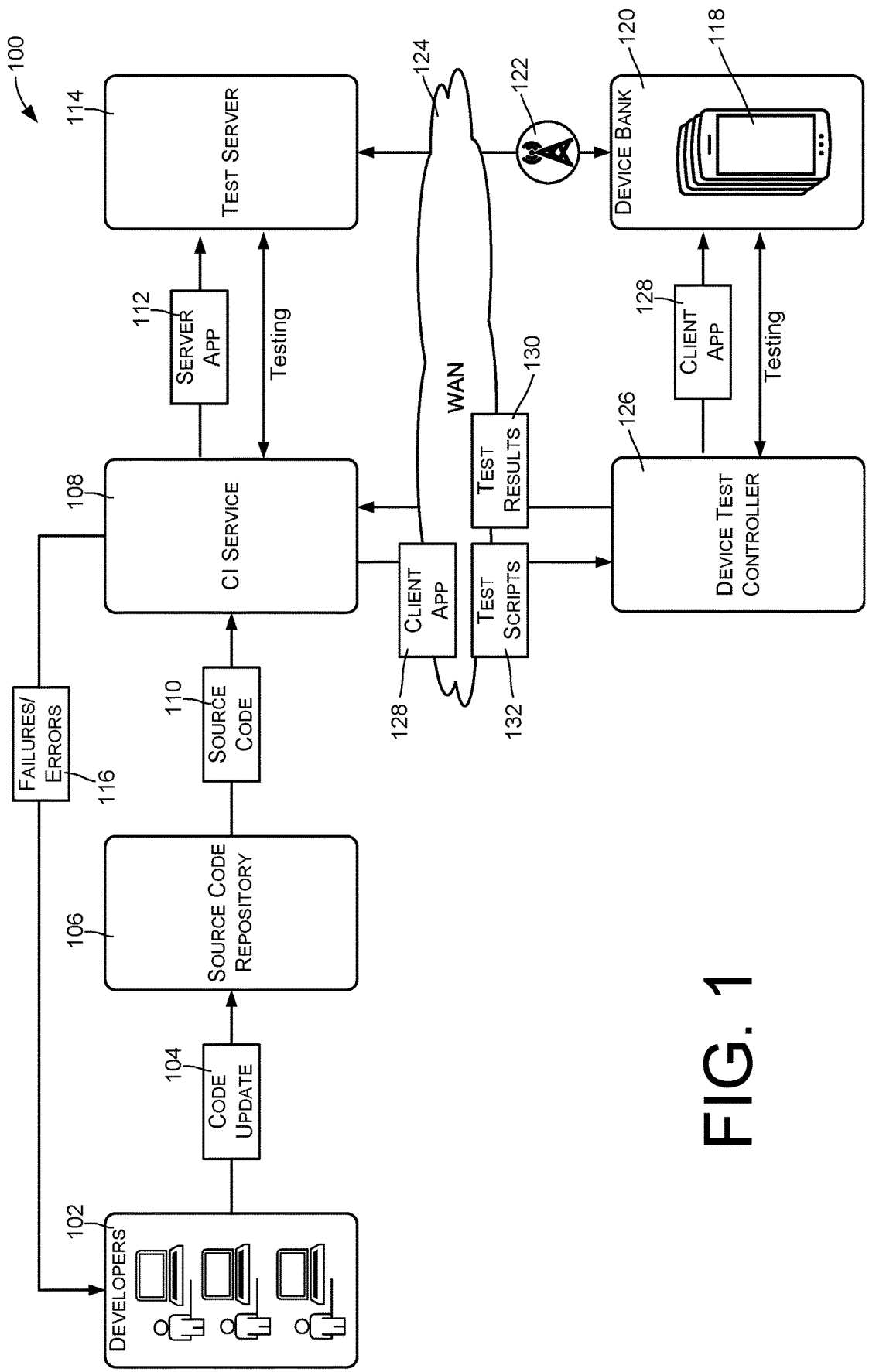
FIG. 1 is a block diagram of an example configuration that enables continuous integrated testing of network-based server/client applications.

The described implementations provide devices, systems, and methods for developing a server application. In certain environments described herein, a continuous integration (CI) service is used by developers who are writing code for an application. When using CI, multiple developers may work on an application and may independently submit modified application files or other application resources to a source code repository. Either periodically or in response to certain source code commits, a CI build server rebuilds the target application, deploys it for execution by a test server, and tests the server application using automate testing techniques. Any errors found in this process are reported to the developers.

A client application is designed to run on devices having network connectivity, such as various types of computers, mobile devices, and other equipment. The client application may rely on the server application for certain services and/or resources. For example, the server application may store data on behalf of the client application, and the client application may query the server to obtain the data when needed. In other cases, the server application may provide data such as weather data, financial data, or any of various other types of data. As another example, a client application may query a server application for specified music, and the server application may respond by providing the music as a data stream.

In embodiments described herein, multiple wireless communication devices, referred to as "wireless devices" herein, are provisioned to operate as part of a cellular or other wireless communications network. The wireless devices may be the same brands and models that are sold to consumers, and may include smartphones, tablet computers, wearable computers, hotspots, controllers, automation equipment, and other devices, including both mobile and stationary devices. The term "wireless" is used in this environment to indicate that a device is able to communicate wirelessly, and does not necessarily mean that the device is unable to communicate using wired connections.

In certain embodiments, each wireless device is connected to communicate with a physically separate test controller. The test controller has independent network connectivity and can be configured and/or instructed to configure and control the wireless devices, and to run tests on the wireless devices.

In certain embodiments, the test controller configures the wireless devices to run the client application. While the client application is running, the test controller tests the operation of the client application on each of the wireless devices in order to evaluate whether the server application is performing as expected. Results of this testing are provided to the CI service.

In some embodiments, the CI service may be configured to control the testing performed by the test controller. For example, developers may design test scripts for client devices and provide the test scripts to the CI service. As needed, the CI service provides the test scripts to the test controller, which responds by executing the test scripts against each of the wireless devices, or on a subset of devices matching pre-defined or dynamic conditions. For example, the subset might include devices manufactured by a particular vendor, or containing specific hardware capabilities.

In some embodiments, the CI service may be configured to repeatedly run an integration test of the server application. The CI service may run the integration test after every developer code commit, within a certain time after every code commit, or at periodic or scheduled intervals. In some cases, the integration test may be run iteratively, so that as soon as one iteration of the integration test is complete, a second iteration is started. However, note that in this environment, the term "continuously" means merely that testing is performed repeatedly, and does not indicate that testing is being performed at all times. That is, in some cases or embodiments, there may be time gaps between test iterations.

An integration test comprises obtaining source code from a source code repository, building the server application from the source code, deploying the server application for execution on a test server, and running tests on the server application as it executes. Any test failures are reported to developers, providing rapid feedback when code submissions "break" the server application.

The CI service may also be configured to test operation of the client application in conjunction with the integration tests of the server application. A test of the client application may involve installing the client application on a wireless device, initiating execution of the client application, providing simulated user input to the client application, and evaluating the responses of the client application. The CI service reports any client application test failures to the developers along with any server application test failures. When reporting a test failure, the CI service may also indicate which individual code commit most likely caused the test failure.

The integration of server testing and client testing provides more comprehensive information to developers regarding code submissions. The integration allows developers to know not only when their code submissions have caused test failures of the server application, but to also know when their code submissions for the server application have caused test failures in the client application. Test failures in the client application may indicate that there is a problem with recently submitted server code or that the client application needs to be modified.

The wireless devices used for testing can be located remotely from the CI service and can be configured such that the client application relies on cellular or other wireless data connectivity. This allows end-to-end testing of both the server application and companion client application in real-world conditions.

FIG. 1 illustrates an example configuration 100 for testing a server application and a companion client application, where the client application is intended to run on a wireless device and where the client application relies for at least a part of its functionality on data communications with the server application through a cellular or other wireless communications network.

The configuration 100 is designed for continuous integration (CI) testing of the server application, which may also include testing of the client application. When using CI techniques, developers 102 frequently submit code updates 104 to a source code repository 106. A CI service 108 monitors the source code repository 106 and periodically performs integration tests of the server application. For example, an integration test may be performed after a developer commits updated code to the source code repository 106. As another example, an integration test may be performed periodically, regardless of whether there has been a code commit. As another example, integration tests may be performed iteratively, with one iteration immediately following a previous iteration.

The integration test performed by the CI service 108 comprises obtaining source code 110 for the server application from the source code repository 106, building a server application 112 from the source code 110, deploying the server application 112 to a test server 114, running various tests on the server application 112, and reporting any test failures and/or errors 116 to the developers 102.

Each integration test may also include testing a client application on one or more wireless devices 118 of a device bank 120, where the wireless devices 118 are devices that have been deployed and provisioned for operation on a cellular communications network 122. The cellular communications network 122 may in turn allow the wireless devices 118 to communicate with and through a wide-area network (WAN) 124 such as the Internet, and through the WAN 124 with the test server 114.

The CI service 108 may comprise one or more computing devices, such as computer servers, that are configured to facilitate CI development. The CI service 108 has network communications with the source code repository 106 and the test server 114.

The wireless devices 118 may include any types of devices that are configured for use in conjunction with the cellular communications network 122, including smartphones, tablet computers, laptop computers, wearable devices, control devices, automation devices, etc. Furthermore, the wireless devices 118 may comprise consumer devices of brands and models that are sold, leased, or otherwise provided for use on the cellular communications network 122. Such wireless devices may include devices that are currently available for purchase by consumers, devices that are in development for future release to consumers, and "legacy" devices that were previously available for purchase by consumers but that are no longer available for purchase by consumers but may still be in use by consumers. Generally, the wireless devices 118 include devices of different types, models, or configurations that communicate using wireless cellular communication signals with and over the cellular communications network 122, and that are commonly used on the cellular communications network 122.

The cellular communications network 122 may support traditional cellular services such as voice calls and text messaging. In addition, the cellular communications network 122 may support IMS (IP Multimedia Subsystem) services, such as audio, video, messaging, conferencing, location sharing, and so forth. In certain implementations, the cellular communications network 122 may comprise a GSM (global system for mobile communications) network.

The configuration 100 has a device test controller 126 that is configured to receive a client application 128 from the CI service 108, to perform testing of the client application 128 on the wireless devices 118, and to provide test results 130 to the CI service 108. Communications between the CI service 108 and the device test controller 126 may be through the WAN 124, which may in some cases comprise the Internet. Accordingly, the device test controller 126 and the device bank 120 can be physically remote from the CI service 108, such as in a different geographical location than the CI service 108. In some cases or embodiments, the device test controller 126 and the CI service 108 may communicate over a private data communications network.

To perform testing of the client application 128 on the wireless devices 118, the device test controller 126 sends commands and receives data through instrumentation interfaces of the wireless devices 118. The instrumentation interfaces, also referred to as debug interfaces, accept commands that control configuration and operation of the devices 118. Commands can also simulate user input. Commands can similarly request data indicating responses and other output of applications that execute on the wireless devices 118, including output and status of user interfaces. Commands can also request information regarding states, conditions, and configurations of the wireless devices 118, as well as resources, and applications that are executing on the wireless devices 118.

Although FIG. 1 shows only a single test controller 118, other implementations may have multiple test controllers 118 for each device bank 120, where each test controller 118 is connected to control a respective subset of the test controllers 118.

In the described embodiment, at least some of the wireless devices 118 operate using any one of several variants of the Android operating system, including variants intended for phones, tablets, wearable devices, laptop computers, controllers and automation devices, etc., and including variants intended for devices of multiple manufacturers. As an example of a debug interface, the Android operating system supports a logical interface, accessible through a USB port or other wired interface of a device, that can be used for debugging and development. The interface, referred to as Android Debug Bridge or ADB interface, allows use of a command/query language and syntax to interact with Android-based devices, allowing control of the devices for development and testing. ADB also includes a communication stack that facilitates communications between an external device (in this case the device test controller 126) and a device that is running the Android operating system (in this case a wireless device 118).

The wireless devices 118 may also include devices using other operating systems, which may have their own respective types or variants of debug interfaces.

The device test controller 126 may in some embodiments perform testing based on test scripts 132 received from the CI service 108, each of which can be executed against any of the wireless devices 118. Each test script 132 specifies a sequence of operations to be performed with respect to a wireless device 118. Operations may include loading and initiating applications, simulating user input, receiving or detecting user interface output, evaluating system resources or other resources being used by the wireless device 118 or an application executing on the wireless device 118, and so forth.

In operation, the CI service 108 monitors the source code repository 106 to detect code changes, such as may result when a developer 102 submits updated source code. In response to detecting a source code update 104, the CI service 108 obtains the source code 110 from the source code repository 106, builds the server application 112 based on the source code 110 and possibly other resources, deploys the server application 112 to the test server 114, and performs testing of the server application 112 as it executes on the test server 114.

In conjunction with testing the server application 112, the CI service 108 provides the client application 128 and associated test scripts 132 to the device test controller 126. The device test controller 126 loads and initiates the client application 128 on one or more of the wireless devices 118 and performs testing by running the test scripts 132. After completing the test scripts 132, or whenever a test failure is detected, the device test controller 126 sends test results 130 to the CI service 108. The test results 130 include any detected failures of the tests specified by the test scripts 132.

In some embodiments, the client application 128 may be tested after or in response to each rebuild and deployment of the server application 112. In other embodiments, the client application 128 may be tested periodically on the selected wireless devices 118, or in response to some other stimulus.

In some cases or embodiments, the client application 128 may be tested on all of the wireless devices 118 of the device bank 120. In other cases or embodiments, the client application 128 may be tested on a subset of the wireless devices 118 that satisfy predefined or dynamically specified conditions. For example, the subset may comprise devices of a particular model or devices having specified characteristics.

After completing the testing of the server application 112 on the test server 114 and the client application 128 on the wireless devices 118, the CI service 108 compiles and records test results, and notifies the developers and/or others of any test failures and/or errors 116, including errors and/or failures of the server application 112 and errors and/or failures of the client application 128. Any reported failures may be associated by the CI service 108 with the particular code update 104 that triggered the integration test, after which the integration test was performed. In addition, performance metrics such as server response latency may also be included with reported test results. In some cases or embodiments, the CI service 108 may also notify the developers and/or others of successfully performed tests.

The CI service 108 may perform an integration test as described above after every source code update 104, in response to every source code update 104, at periodical intervals, continuously, upon receiving instructions from a developer 102, or at any other appropriate or desired times.

In some implementations, rather than receiving the client application 128 from the CI service 108, the device test controller 126 may cause the wireless devices 118 to obtain and install the client application 128 from an online repository such as an application store.

In some implementations, rather than receiving the test scripts 132 from the CI service 108, the device test controller 126 may perform preconfigured tests of the wireless devices 118. For example, a developer 102 may interact directly with the device test controller 126 to configure it for certain types of testing of the wireless devices 118. The device test controller 126 may be configured to run tests continuously and to report any test failures to the CI service 108. Alternatively, the device test controller 126 may be configured to run tests in response to instructions from the CI service 108 and to then report test results to the CI service 108.

In some embodiments, the CI service 108 may be used to support CI development of the client application 128, in addition to development of the server application 112. The code updates 104 may include updates to client application source code, and the CI service may build and deploy the client application 128 to the device test controller 126 upon detecting any updates to the client application source code.

In some cases, upon or after a change in the source code of either the server application 112 or the client application 128, the CI service 108 may perform an integration test that includes testing the server application 112 on the test server 114 and testing the client application 128 on the devices 118.

Although various elements of FIG. 1 are shown and described as being discrete devices or components for purposes of discussion, any of the illustrated computing elements may in practice comprise one or more physical, virtual, or otherwise abstracted cluster or network of machines and/or devices. For example, although the test server 114 is described as a single entity, the term "test server" is intended to reference any one or more computing devices, including physical devices and virtual computing units, and including network-based devices that are commonly referred to as being in the cloud.

Figure 2:
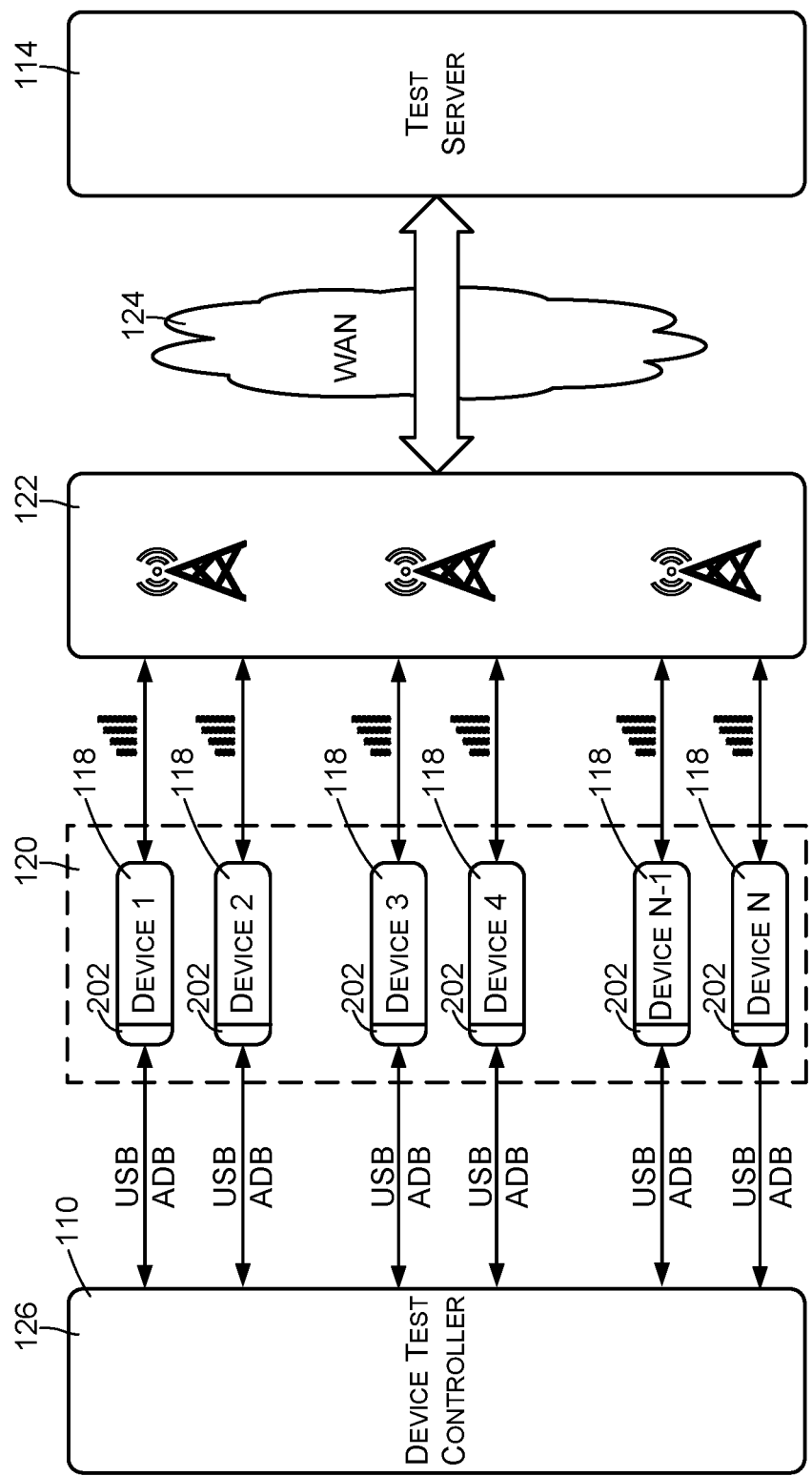
FIG. 2 is a block diagram showing further details of the example configuration shown in FIG. 1.

FIG. 2 illustrates further details of the configuration 100 in an example implementation. In particular, FIG. 2 illustrates details regarding how communications are implemented with the wireless devices 118.

FIG. 2 shows an example of the device bank 120, which has any number N of the wireless devices 118. In some embodiments, the wireless devices 118 may be of respectively different device brands, models, types, and/or configurations.

Each wireless device 118 of a bank 120 has a wired communication port 202 such as a USB (Universal Serial Bus) port. In addition, each wireless device 118 implements a logical control interface that can be accessed through the USB port for interacting with and controlling the wireless device 118. In certain embodiments, the logical control interface may comprise an ADB (Android Debug Bridge) interface. In other embodiments, logical control interfaces may support remote debugging connections and protocols other than ADB.

Within each device bank 120, each wireless device 118 is connected by a wired USB connection to the device test controller 126. Each device test controller 126 may comprise a relatively inexpensive diskless, single-board computer or controller having an Ethernet network port and one or more other wired communication ports such as USB (Universal Serial Bus) device ports. Each device test controller 126 may be configured and programmed by way of a code image that is stored on a removable memory card. For example, a device test controller 126 may have a slot into which a removable SD memory card is inserted, and the code image for the device test controller 126 may be stored on the SD memory card. The device test controller 126 may be easily reconfigured by changing its memory card. Each device test controller 126 may support any number of wireless devices 118.

In the example shown by FIG. 2, each device test controller 126 is connected to a corresponding wireless device 118 through the wired communication port 202 of the wireless device 118. Specifically, each device test controller 126 is connected by USB cables to the USB communication ports 202 of one or more wireless devices 118, using respective USB communication ports (not shown) of the device test controller 126.

The device test controller 126 has a network interface or adapter (not shown in FIG. 2), such as an Ethernet adapter or Wi-Fi interface, that enables communications with the CI service 108 through a communications network such as a local-area network or a wide-area network. The wide-area network may comprise or include the Internet in some embodiments.

The device test controller 126 performs testing of the wireless devices 118 using ADB communications between the test controller 126 and the wireless devices. The wireless devices 118 communicate using the cellular communications network 122 and through the WAN 124 with the test server 114.

In some embodiments, the device test controller 126 may be configured to execute the test scripts 132 of FIG. 1. Upon receiving a test script 132, the device test controller 126 executes the operations specified by the test script 132, obtains resulting data, and sends the data back to the test controller 126.

Figure 3:
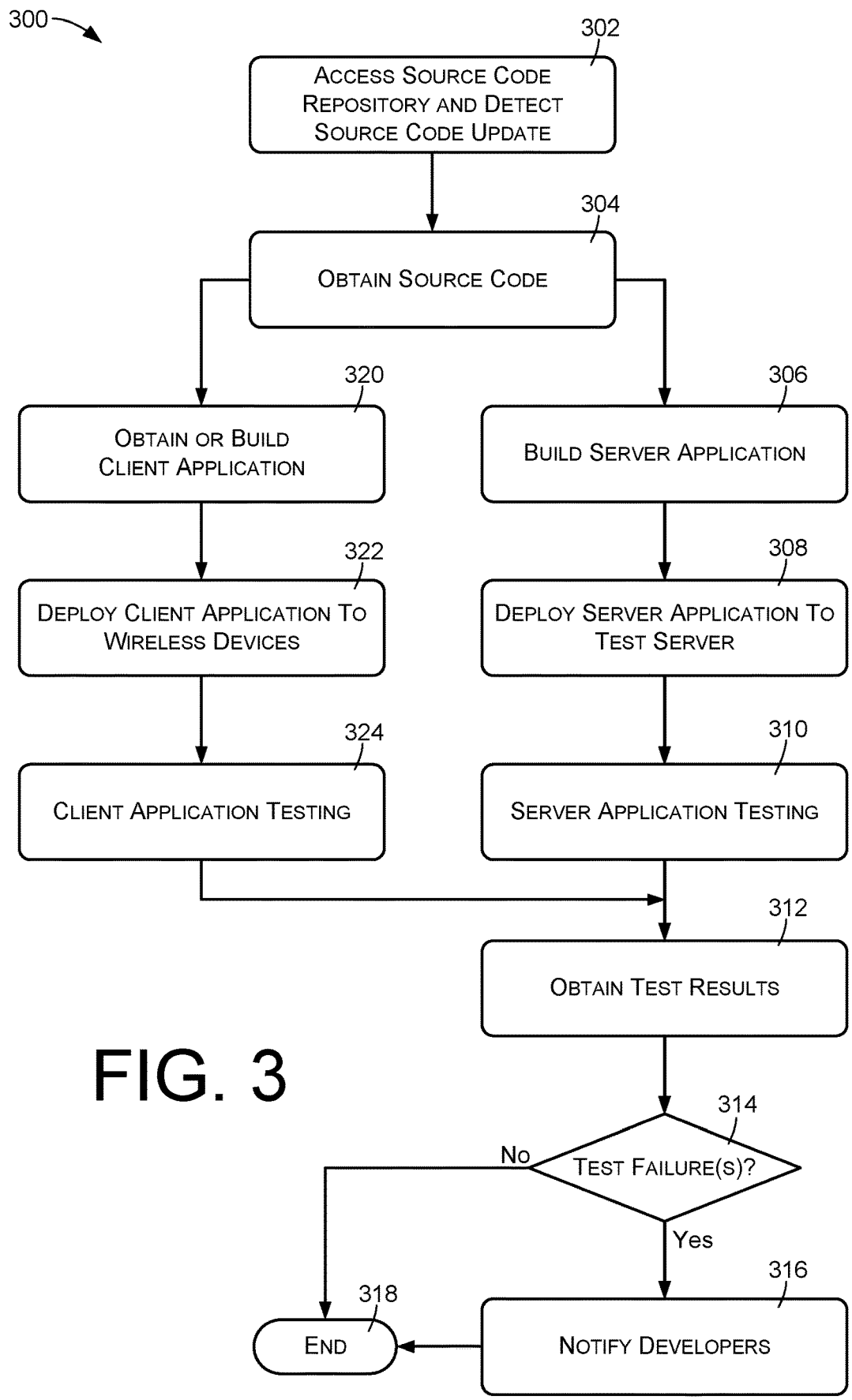
FIG. 3 is a flow diagram illustrating an example method of continuous integration testing of network-based server/client applications.

FIG. 3 illustrates an example method 300 for application testing. In FIG. 3, it is assumed that one or more developers are developing a server application that will be used to support and/or provide services to a client application, and that the client application is designed to run on cellular or other wireless communication devices.

The actions of FIG. 3 may be performed by one or more servers or other components of a continuous integration (CI) service such as the CI service 108 described above. Although the example method 300 is described in the context of the configuration 100 of FIG. 1, the method 300 can also be performed in conjunction with other configurations. Furthermore, different embodiments may different combinations and/or sets of the actions shown in FIG. 3.

An action 302 comprises accessing a source code repository, where the source code repository stores server source code corresponding to the server application. As described above, developers repeatedly commit changed server code to the source code repository. The CI service monitors the source code repository and detects when there has been a source code commit or any other change in the server source code. In certain embodiments, subsequent actions of FIG. 3 are performed after or in response to detecting a commit of changed server source code. In other embodiments, subsequent actions of the method 300 may be repeated periodically or continuously, or within a given time after a new source code commit.

An action 304 comprises obtaining the source code from the source code repository. Communications with the source code repository may be over a local-area network (LAN) or a wide-area network (WAN), and may in some cases be over the Internet. Accordingly, the source code repository need not be co-located with the CI service.

An action 306 comprises building the server application based at least in part on the server source code that has been received from the source code repository. The action 306 comprises creating executable code based on the server source code, which may include compiling source files to object files, linking the object files, attaching additional resources, packaging, etc.

An action 308 comprises deploying the server application for execution by a test server. Communications with the test server, of which the test server 114 of FIG. 1 is an example, may be through a LAN or WAN, and in some cases may be through a public network such as the Internet. Deployment includes providing the server application to the test server and instructing the test server to execute the server application.

An action 310 comprises testing or initiating a test of the server application that is executing on the test server. Integration tests may be defined by test scripts that have been provided by the developers 102 and associated with the server source code, and the action 310 may comprise running the test scripts.

An action 312 comprises obtaining and/or receiving test results. The test results may include test results from testing the server application on the test server, and may also include test results from testing the client application on one or more client devices. The devices 118 of FIG. 1 are examples of client devices.

In some embodiments, testing of the client application may happen independently of the CI service, and the CI service may receive test results from components, services, or systems that are doing the testing of the client application. For example, the action 312 may include receiving data from a test controller associated with the cellular communication devices, such as the test controller 126 of FIG. 1.

The test results comprise data that may relate to various information. For example, the test data may include performance metrics of the server application and the client application. As another example, the test data may specify results of functional tests. In some embodiments, the test data may specify whether any tests failed and if so, which tests failed. The test data may specify additional information regarding test failures, such as relevant parameters, metrics, or error messages.

An action 314 comprises analyzing the test results to determine whether there was a failure of any of the tests of the server application or the client application. In some cases, the test data may indicate specific test failures. In other cases, the CI service may evaluate the test data to determine whether failures have occurred. Test failures may correspond to various conditions detected in relation to the server application and the client application, including application errors, crashes, performance issues, and so forth, as defined by the particular tests that are performed.

If one or more failures are detected, from tests of either the server application or the client application, an action 316 is performed of notifying or otherwise communicating the failure to at least one of the developers. The CI service may perform this action in various ways, depending on implementation details. As one example, the CI service may cause a message to be displayed on a terminal of a developer. The message may indicate that a failure occurred, and may indicate the nature of the failure and/or the specific test or tests that failed. The message may also indicate that the failure is associated with or occurred as a result of the earlier source code commit, may identify the source code commit after which the failure occurred, and may also identify the developer responsible for the code commit. In some cases, the message may identify the code or file that was updated in the source code commit and in response to which the testing was performed, as a hint to the likely cause of a failure.

The left side of FIG. 3 shows further actions that may be performed in embodiments in which the CI service controls and/or initiates testing of the wireless devices.

An action 320 may comprise obtaining and/or building the client application. In some cases, the action 320 may comprise retrieving the client application from storage. In other embodiments, however, developers may have a second code development project for the client application, and may use the source code repository to store client source code. In this situation, the action 304 may include obtaining the client source code from the source code repository and building the client application based at least in part on the client source code.

An action 322, which in some embodiments is performed after the action 308 of deploying the server application to the test server, comprises deploying the client application to the cellular communication devices or to a subset of the cellular communication devices. Generally, the action 322 will also include causing the cellular communication devices to execute the client application. In the environment of FIG. 1, the action 322 may comprise sending the client application to the device test controller 126. In response, the device test controller 126 installs the client application on the devices 118. In other embodiments, the CI service may have other ways of accessing the devices and of deploying the client application on the devices.

In some cases, the action 322 may comprise causing the cellular communication devices to obtain the client application from a network-based application market. For example, a test script 132 provided by the CI service 108 to the device test controller 126 may include a step of instructing the devices to download the client application from an online repository and to then install and execute the client application. Devices may also be configured to automatically download and install updates as they are made available through online repositories.

An action 324, also performed after the action 308 of deploying the server application, comprises initiating one or more tests of the client application, or of a server application through a client interface. In the embodiment of FIG. 1, the tests are specified or defined by the test scripts 132, which are provided from the CI service 108 to the device test controller 126, which are then executed by the device test controller 126. In other embodiments, there may be other ways for the CI service 108 to initiate and control testing of the devices 118.

The client application tests may be designed so that they utilize the cellular or other wireless communication capabilities of the devices 118, such as by testing functions of the client application that involve communicating with the test server 114 through the cellular communications network 122.

The action 324 is followed by the action 312, which as already described comprises obtaining the test results generated by the testing of the devices 118.

Figure 4:
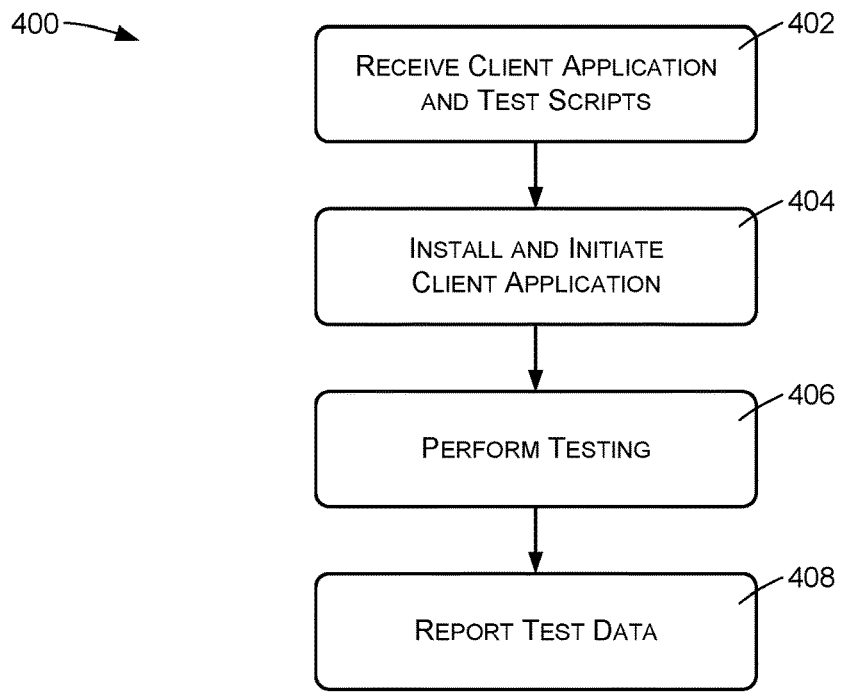
FIG. 4 is a flow diagram illustrating an example method that may be performed by a device test controller to support continuous integration testing of network-based server/client applications.

FIG. 4 illustrates an example method 400 that may be performed by a test controller, such as the device test controller 126 of FIG. 1. As described above, the test controller 126 communicates over a LAN or a WAN with the CI service 108. In addition, the test controller is configured to communicate with the cellular communication devices 118 through respective wired communication interfaces of the cellular communication devices 118. As a specific example, the test controller 126 may have USB connections to the cellular communication devices 118, and may access a logical control interface such as an ADB interface through the USB connection.

An action 402 comprises receiving the client application and associated test scripts from the CI service. The test scripts may in some cases be provided by the developers of the client application and/or the developers of the server application and stored by the CI service 108. In other embodiments, tests may be developed by independent organizations and/or vendors and stored external to CI service 108.

An action 404 comprises installing the client application on the cellular communication devices 118 and initiating the client application to execute on each of the devices 118. The device test controller can use the wired USB connections and logical control interfaces of the devices 118 for this purpose.

An action 406 comprises performing the testing of the client application on the cellular communication devices 118 as specified by the test scripts 132. Again, the device test controller 126 can accomplish this by interfacing with the devices 118 through their wired USB connections and logical control ports.

An action 406 comprises reporting results of testing the client application and indicating any failures to the CI service 108. In some cases, the device test controller 126 may determine whether there have been any failures, based on the test scripts 132, and may explicitly identify any failures to the CI service 108. In other cases, the device test controller 126 may return data that is analyzed by the CI service to identify failures.

Figure 5:
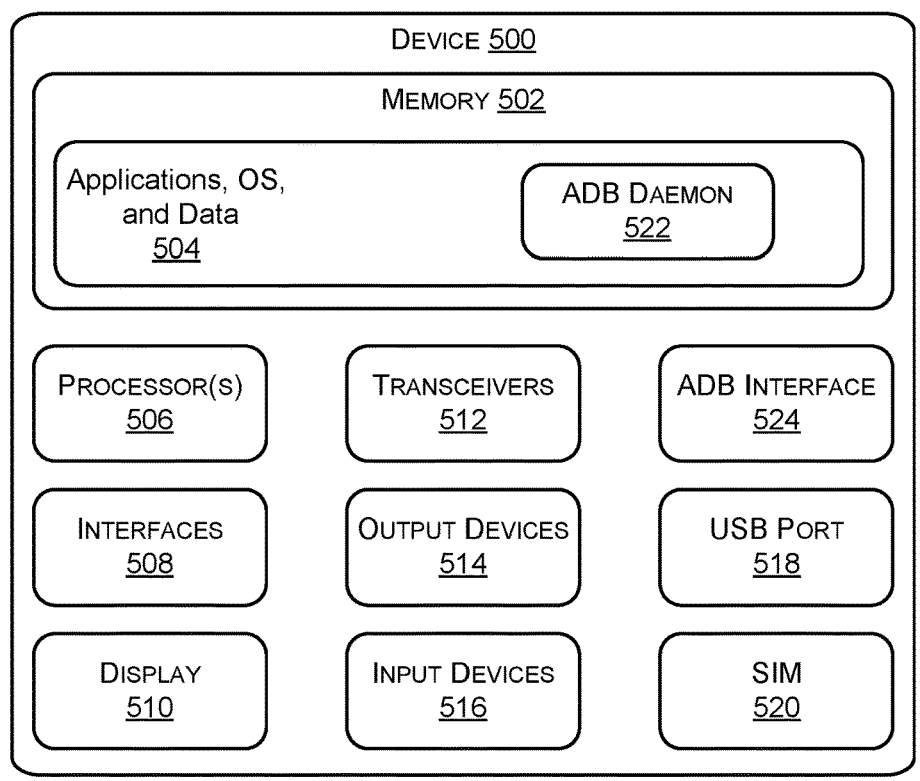
FIG. 5 is a block diagram illustrating example high-level components of a wireless device such as shown in FIGS. 1 and 2.

FIG. 5 illustrates an example communication device 500 in accordance with various embodiments. The device 500 is illustrative of a wireless device 118. The device 500 may include memory 502, which may store applications, an operating system (OS), and data 504. The device 500 further includes processor(s) 506, interfaces 508, a display 510, radio transceivers 512, output devices 514, and input devices 516.

In various embodiments, the memory 502 comprises one or more machine-readable media, which may in turn include volatile and/or non-volatile memory. The memory 502 can also be described as non-transitory computer storage media and may include removable and non-removable media implemented in any method or technology for storage of information, such as computer readable instructions, data structures, program modules, or other data.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 500.

In some embodiments, the processor(s) 506 is a central processing unit (CPU), a graphics processing unit (GPU), or both CPU and GPU, or other processing unit or component known in the art.

In various embodiments, the interfaces 508 are any sort of interfaces known in the art. The interfaces 508 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 510 may comprise a liquid crystal display or any other type of display commonly used in telecommunication devices or other portable devices. For example, the display 510 may be a touch-sensitive display screen, which may also act as an input device or keypad, such as for providing a soft-key keyboard, navigation buttons, or the like.

In some embodiments, the transceivers 512 include any sort of transceivers known in the art. For example, the transceivers 512 may include radios and/or radio transceivers and interfaces that perform the function of transmitting and receiving radio frequency communications via an antenna, through a cellular communications network of a wireless data provider. The radio interfaces facilitate wireless connectivity between the device 500 and various cell towers, base stations and/or access points.

In some embodiments, the output devices 514 include any sort of output devices known in the art, such as a display (already described as display 510), speakers, a vibrating mechanism, or a tactile feedback mechanism. The output devices 514 also include ports for one or more peripheral devices, such as headphones, peripheral speakers, or a peripheral display.

In various embodiments, the input devices 516 include any sort of input devices known in the art. For example, the input devices 516 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The device 500 may have a USB (universal serial bus) port 518 that provides communications with peripheral devices, and which in the embodiment of FIG. 2 connects to the device test controllers 126. The USB port 518 may also in some cases serve as a battery charging port.

The device 500 may have a SIM (subscriber identity module) 520, which is a removable smart card used to identify a user of the device 500 to the cellular communications network 122.

In some embodiments, the applications, OS, and data 504 may include an ADB daemon 522, which is an application that runs as a background process to respond to ADB commands. The ADB daemon 522 creates and communicates through an ADB interface 524, which is accessible through the USB port 518.

Figure 6:
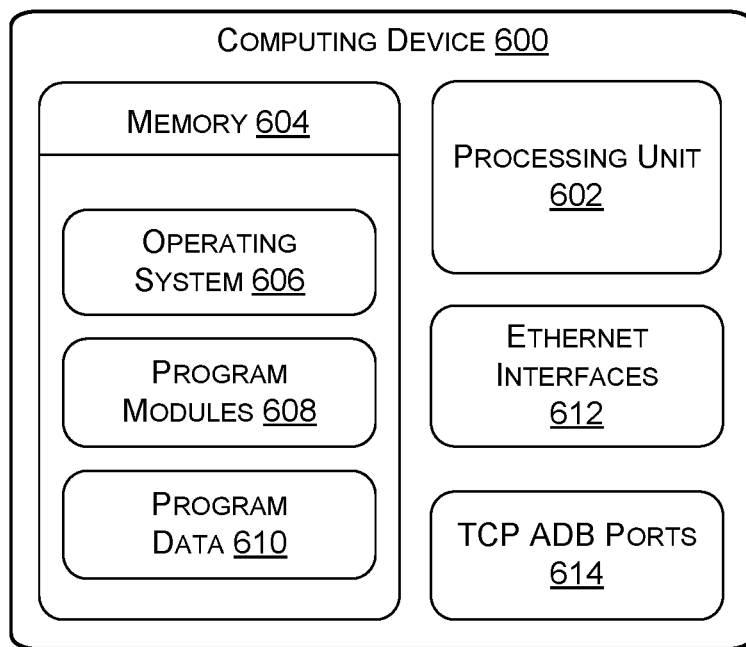
FIG. 6 is a block diagram illustrating example high-level components of a computing device, one or more of which may be used to implement one or more components of FIG. 1, such as a continuous integration (CI) service.

FIG. 6 is a block diagram of an illustrative computing device 600 such as may be used to implement various components shown in FIG. 1, such as the CI service 108 and the test server 114. In various embodiments, the computing device 600 may include at least one processing unit 602 and memory 604. Depending on the exact configuration and type of computing device, the system memory 604 may be volatile (such as RAM), non-volatile (such as ROM, flash memory, etc.) or some combination of the two. The memory 604 may include an operating system 606, one or more program modules 608, and may include program data 610. The memory may also include data storage devices (removable and/or non-removable) such as, for example, magnetic disks, optical disks, or tape.

The memory 604 may comprise non-transitory computer storage media. Such non-transitory computer storage media may include volatile and nonvolatile, removable and non-removable media implemented in any method or technology for storage of information, such as computer readable instructions, data structures, program modules, or other data. The non-transitory computer-readable storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600.

In various embodiment, any or all of the memory 604 may store programming instructions which, when executed, implement some or all of the function functionality described above as being implemented by the CI service 108.

The computing device 600 may have one or more Ethernet interfaces 612, which may be used for connecting to a wide-area network such as the Internet. The computing device 600 may create and expose multiple TCP-based ADB ports 614 for communications with external devices such as the device test controller 126.

The computing device 600 may have various other elements such as a keyboard, a mouse, a touch-sensitive display, voice input device, etc. Output device(s) such as a display, speakers, a printer, etc. may also be included.

Figure 7:
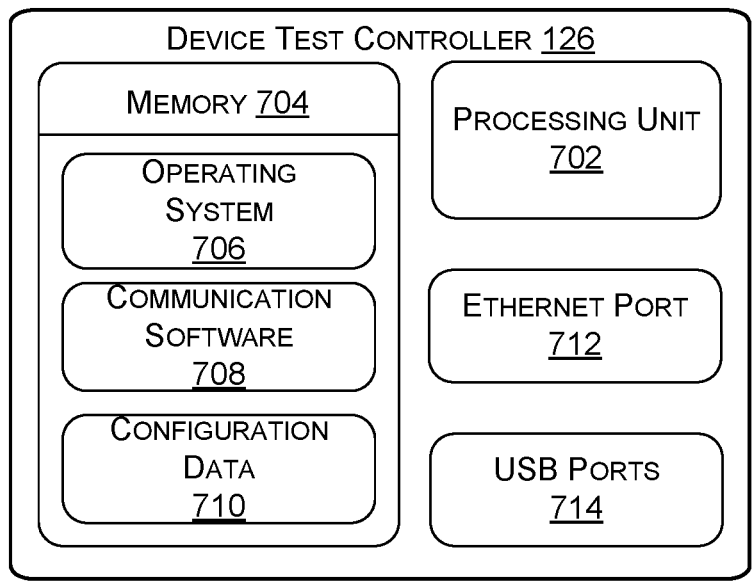
FIG. 7 is a block diagram illustrating example high-level components of a device test controller such as shown in FIGS. 1 and 2.

FIG. 7 illustrates an example implementation of a device test controller 126, and shows basic, high-level components of such as device. The components may include at least one processing unit 702 and associated memory 704. In the described embodiment, the memory includes a removable, non-volatile memory card such as may be implemented using flash memory technologies. Such a removable memory card may be used to store a code image in order to configure operation of the device test controller 126.

Generally, the memory 704 comprises non-transitory computer storage media of various types. Such non-transitory computer storage media may include volatile and nonvolatile, removable and non-removable media implemented in any method or technology for storage of information, such as computer readable instructions, data structures, program modules, or other data. The non-transitory computer-readable storage media may further include, but is not limited to, RAM, ROM, EEPROM, flash memory or other memory technology.

In various embodiment, any or all of the memory 704 may store programming instructions which, when executed by the processing unit 702, implement some or all of the function functionality described above as being implemented by the device test controller 126.

More specifically, the memory 704 may include an operating system 706 and various other software. As a specific example, FIG. 7 shows communication software 708 such as may be used to communicate with the wireless devices 118. The memory 704 may also contain various types of configuration data 710.

The device test controller 126 may have an Ethernet interface 712 for communications with the CI service 108 over a wide-area network such as the Internet. The device test controller 126 may have multiple USB ports 714 for communication with the wireless devices 118.

Although features and/or methodological acts are described above, it is to be understood that the appended claims are not necessarily limited to those features or acts. Rather, the features and acts described above are disclosed as example forms of implementing the claims.

What is claimed is:

1. A system for development of a server application to support a client application, the system comprising:
   multiple cellular communication devices provisioned to operate with a cellular communications network, the cellular communication devices being configured to run the client application, wherein the client application communicates with the server application through the cellular communications network;
   a continuous integration service stored in a memory and configured to perform actions comprising:
      accessing a source code repository having server source code for the server application, wherein developers commit the server source code to the source code repository;
      building the server application based at least in part on the server source code;
      deploying the server application for execution by a test server;
      after deploying the server application, initiating a test of the server application on the test server;
      receiving data indicating a failure of a test of the client application on at least one of the cellular communication devices; and
      communicating the failure of the test of the client application to at least one of the developers that committed the server source code to the source code repository, wherein an indication of the failure of the test of the client application specifies which commit of the server source code the failure of the test of the client application is associated with.

2. The system of claim 1, the actions further comprising:
   building the client application based at least in part on client source code; and
   initiating the test of the client application after deploying the server application.

3. The system of claim 1, the actions further comprising, after deploying the server application, initiating the test of the client application.

4. The system of claim 1, wherein the cellular communication devices comprise one or more of:
   devices that are currently available for purchase by consumers;
   devices that are in development for future release to consumers; or
   devices that were previously available for purchase by consumers but that are no longer available for purchase by consumers.

5. The system of claim 1, further comprising one or more test controllers configured to:
   receive the client application from the continuous integration service;
   perform the test of the client application on the cellular communication devices; and
   send the data indicating the failure to the continuous integration service.

6. The system of claim 1, further comprising:
   one or more test controllers configured to perform the test of the client application on the cellular communication devices;
   wherein the one or more test controllers are configured to communicate with the cellular communication devices through respective wired communication interfaces of the cellular communication devices.

7. The system of claim 6, wherein:
   the test controller is geographically remote from the continuous integration service; and
   the data is received from the test controller via a wide-area network.

8. A method for development of a server application to support a client application, the method comprising:
   accessing a source code repository having server source code for the server application, wherein one or more developers commit the server source code to the source code repository;
   after a source code commit to the source code repository, building the server application based at least in part on the server source code;
   deploying the server application for execution by a test server;
   initiating a test of the server application on the test server after deploying the server application;
   initiating a test of the client application on a cellular communication device that is provisioned to operate with a cellular communications network, wherein the client application communicates with the server application through the cellular communications network;
   determining that there has been a failure of the test of the client application;
   providing a communication of the failure of the client application to at least one of the one or more developers that committed the server source code to the source code repository; and
   receiving a commit from the one or more developers of an updated version of the server source code subsequent to providing the communication of the failure of the test of the client application.

9. The method of claim 8, wherein the communication indicates that the failure was associated with the source code commit.

10. The method of claim 8, wherein building the server application is in response to the source code commit.

11. The method of claim 8, further comprising, after deploying the server application, causing the cellular communication device to execute the client application.

12. The method of claim 8, further comprising:
causing the cellular communication device to obtain the client application from a network-based application market; and
after deploying the server application, causing the cellular communication device to execute the client application.

13. The method of claim 8, further comprising:
building the client application based at least in part on client source code; and
causing the cellular communication device to execute the client application.

14. The method of claim 8, wherein the cellular communication device comprises:
a device that is currently available for purchase by consumers;
a device that is in development for future release to consumers; or
a device that was previously available for purchase by consumers but that is no longer available for purchase by consumers.

15. The method of claim 8, further comprising communicating with the cellular communication device through a wired interface of the cellular communication device.

16. The method of claim 8, wherein determining that there has been a failure of the test of the client application comprises receiving data from a test controller associated with the cellular communication device.

17. One or more non-transitory computer-readable media storing computer-executable instructions that, when executed by one or more processors, cause the one or more processors to perform actions comprising:
after a commit of server source code by a developer of the commit of the server source code, building a server application based at least in part on the server source code;
deploying the server application for execution by a test server;
initiating a test of the server application on the test server after deploying the server application;
initiating a test of a client application on a client device that is configured to communicate through a wireless communications network, wherein the client application communicates with the server application through the wireless communications network;
determining that there has been a failure of the test of the client application; and
communicating the failure of the client application to the developer that committed the commit of the server source code, wherein an indication of the failure specifies which commit of the server source code the failure of the client application is associated with.

18. The one or more non-transitory computer-readable media of claim 17, the actions further comprising communicating to the developer that the failure was in response to the commit of the server source code.

19. The one or more non-transitory computer-readable media of claim 17, the actions further comprising, after deploying the server application, causing the client device to execute the client application.

20. The one or more non-transitory computer-readable media of claim 17, the actions further comprising:
building the client application based at least in part on client source code; and
causing the client device to execute the client application.

* * * * *